(12) United States Patent
Yang

(10) Patent No.: US 8,165,126 B2
(45) Date of Patent: Apr. 24, 2012

(54) METHOD, APPARATUS AND SYSTEM FOR SELECTING VMG

(75) Inventor: Weiwei Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 12/410,834

(22) Filed: Mar. 25, 2009

(65) Prior Publication Data

US 2009/0180488 A1 Jul. 16, 2009

Related U.S. Application Data

(63) Continuation of application No. PCT/CN2008/071229, filed on Jun. 6, 2008.

(30) Foreign Application Priority Data

Jun. 11, 2007 (CN) .......................... 2007 1 0112363

(51) Int. Cl.
*H04L 12/28* (2006.01)
*H04L 12/56* (2006.01)

(52) U.S. Cl. ......... 370/392; 370/401; 370/352; 370/353

(58) Field of Classification Search .................. 370/392, 370/401, 352, 353; 709/238, 218, 219
See application file for complete search history.

(56) References Cited

U.S. PATENT DOCUMENTS

| 6,766,377 | B1* | 7/2004 | Grabelsky et al. | 709/238 |
|---|---|---|---|---|
| 6,985,734 | B2* | 1/2006 | Niska | 455/445 |
| 7,269,658 | B2* | 9/2007 | Tao | 709/229 |
| 7,333,492 | B2* | 2/2008 | Wu et al. | 370/392 |
| 7,634,577 | B1* | 12/2009 | Grabelsky et al. | 709/238 |
| 2003/0064725 | A1* | 4/2003 | Niska | 455/445 |
| 2005/0085181 | A1* | 4/2005 | Tao | 455/1 |
| 2006/0111112 | A1* | 5/2006 | Maveddat | 455/439 |
| 2010/0067437 | A1* | 3/2010 | Vikberg et al. | 370/328 |

FOREIGN PATENT DOCUMENTS

| CN | 1533109 A | 9/2004 |
|---|---|---|
| CN | 1553668 A | 12/2004 |
| CN | 1561038 A | 1/2005 |
| CN | 1878150 A | 12/2006 |
| CN | 1937577 A | 3/2007 |
| CN | 101325564 | 12/2008 |

(Continued)

OTHER PUBLICATIONS

International Search Report from P.R. China in International Application No. PCT/CN2008/071229 mailed Sep. 18, 2008.

(Continued)

*Primary Examiner* — Chuong T Ho
(74) *Attorney, Agent, or Firm* — Finnegan, Henderson, Farabow, Garrett & Dunner LLP

(57) ABSTRACT

A method, apparatus and system for selecting a Virtual Media Gateway are provided. The method for selecting a VMG includes: setting the service domain information on a VMG by extending a property parameter, after receiving the event triggering message on the bearer layer, the physical MG matches the source identifier information carried in the event triggering message with the service domain information on each VMG, If determining that the source identifier information is included in the service domain on a VMG, the physical MG may select the corresponding VMG accordingly.

15 Claims, 4 Drawing Sheets

FOREIGN PATENT DOCUMENTS

WO WO03030570 A1 4/2003

OTHER PUBLICATIONS

Supplementary European Search Report dated (mailed) Nov. 10, 2009, issued in related European application No. 08757640.1, Huawei Technologies Co., Ltd.

Series H: Audiovisual and Multimedia Systems—Infrastructure of audiovisual services—Communication procedures; Gateway control protocol: Version 3, ITU-T Recommendation H.248.1, International Telecommunication Union, Sep. 2005, 206 pages.

Groves, C. et al., "The Megaco/H.248 Gateway Control Protocol, Version 2; draft-ietf-megaco-h248v2-04.txt", IETF Standard Working Draft, Internet Engineering Task Force, IETF, vol. Megaco, No. 4, Apr. 1, 2003.

Groves, C. et al., "Gateway Control Protocol Version 1", Request for Comments 3525, Network Working Group, The Internet Society (Jun. 2003), 213 pages.

Cuervo, F. et al., "Megaco Protocol; draft-ietf-megaco-protocol-07.txt", IETF Standard Working Draft, Internet Engineering Task Force. IETF, vol. Megaco, No. 7, Feb. 21, 2000.

Albrecht Schwarztd-39 Telecommunicationstandardization Sector, Study Group 16, Updated draft new ITU-T Recommendation H.248.55 (ex H.248.PLM) "Pull Mode Packages" (Ed. 0.7), Shenzhen, Mar. 12-16, 2007, Study Period 2005-2008, 24 pages.

European Patent Office Communication pursuant to Article 94(3) EPC, European search opinion for Application No. 08757640.1, mailed Nov. 5, 2010, Huawei Technologies Co., Ltd.

Written Opinion of the International Search Authority (translation) dated (mailed) Sep. 18, 2008, issued in related Application No. PCT/CN2008/071229, Filed Jun. 6, 2008, Huawei Technologies Co., Ltd.

* cited by examiner

METHOD, APPARATUS AND SYSTEM FOR SELECTING VMG

This application is a continuation of international application number PCT/CN2008/071229, filed on Jun. 6, 2008, and claims the benefit of priority from the Chinese Patent Application No. 200710112363.4, filed with the Chinese Patent Office on Jun. 11, 2007 entitled "Method, Apparatus and System for Selecting VMG", both of which are incorporated herein by reference in their entirety.

TECHNICAL FIELD

Embodiments disclosed herein relate to the communication field, and in particular, to a method, apparatus, and system for selecting a Virtual Media Gateway (VMG).

BACKGROUND

The Media Gateway Controller (MGC) and the Media Gateway (MG) are two key components of a packet-switched network. The MGC is responsible for the call control function, and the MG is responsible for the service bearing function. In this way, the call control plane is separated from the service bearer plane, the network resources are sufficiently shared, the equipment upgrade and the service extension are simplified, and the development and maintenance costs are slashed. FIG. 1 shows a networking structure of the MGC and the MG.

The media gateway control protocol is a main protocol for communication between the MG and the MGC. The currently prevalent media gateway control protocols include H.248/Gateway Control Protocol (H.248/MeGaCo) and Media Gateway Control Protocol (MGCP). The MGCP R1 protocol was formulated by the Internet Engineering Task Force (IETF) in October 1999 and revised in January 2003. The H.248/MeGaCo R1 protocol was formulated jointly by the IETF and the International Telecommunications Union (ITU) in November 2000 and revised in June 2003. The H.248 R2 protocol was formulated by the ITU in May 2002 and revised in March 2004, and the H.248 R3 protocol was formulated by the ITU in September 2005.

In the H.248 protocol, various resources on the MG are abstractly represented by terminations. Terminations are categorized into physical terminations and ephemeral terminations. Physical terminations are physical entities which exist semi-permanently, for example, Time Division Multiplex (TDM) channels. Ephemeral terminations represent the public resources which are requested temporarily and released soon after use, such as, Real-time Transport Protocol (RTP) streams. A root termination is used to represent the entirety of the MG. The combinations among terminations are abstractly represented by contexts. A context may include multiple terminations, and interrelations between terminations described through topologies. A termination not related to other terminations is included in a special context called a "null".

Based on an abstract model such as the H.248 protocol, the call connection is actually an operation on the terminations and the contexts. Such operations are performed through Command Requests and Reply between the MGC and the MG. The Command types include: Add, Modify, Subtract, Move, Audit Value, Audit Capabilities, Notify, and Service Change. Command parameters, also referred to as descriptors, are categorized into Property, Signal, Event, and Statistic. The parameters with service relevance are logically aggregated into a package.

In the practical application, a physical MG may be divided into one or more Virtual Media Gateway (VMG). A VMG may consist of a set of statically divided physical termination and/or multiple sets of ephemeral termination. A VMG is controlled by only one MGC at a time. For the MGC, each VMG is a complete MG. However, on a physical MG, it is possible that only one or several network interfaces exist, and each network interface may be shared by multiple VMGs. This mechanism may lead to a complicated problem. For example, when an event occurs on this shared interface, the physical MG needs to identify the proper VMG so as to report the detected event to the MGC that controls the physical MG. In this case, it may complicate the selection of a VMG.

Taking the resource control scenario in the H.248.55 as an example, FIG. 2 is a resource control diagram in the VMG scenario. The function entities involved include: User Equipment (UE), Session Control Function (SCF), Resource Admission Control Function (RACF), and Policy Enforcement Entity (PE-E). When the H.248 is used as an interface protocol between the RACF and the PE-E, and the RACF and the PE-E are equivalent to the MGC and MG in the H.248 entity respectively.

The physical MG in FIG. 2 is divided into multiple VMGs, where VMG1 is controlled by MGC1, and VMG2 and VMG3 are controlled by MGC2. Establishing of a session generally includes two parts: signaling negotiation on the service layer, and resource negotiation on the bearer layer. In the signaling negotiation on the service layer, the MGC may generate an authorization token, which includes a Fully Qualified Domain Name (FQDN) of the MGC and a session identifier for the MGC to uniquely identify a resource request on the bearer layer. The authorization token is carried through a signaling message to the UE. The resource negotiation on the bearer layer is initiated by the UE, and the UE sends an event triggering message to the MG. The message may carry the authorization token information. After receiving the event triggering message from the UE, the MG needs to report a Quality of Service (QoS) Request of Deciding Resource Reservation (RDRR) event in the H.248.55 to the MGC that controls the VMG, so as to request the MGC to send a resource provision decision to the MG. In the case of VMG, after receiving the event triggering message from the UE, the physical MG needs to select a proper VMG first, and then report the detected event to the MGC.

For this problem, a solution provided in the prior art is:

The physical MG resolves the VMG information related to the event according to the resource allocation information (for example, context, address and port of the termination) of each current VMG and/or the received message (for example, authorization token in the event triggering message), and then the specific VMG report the detected event to the MGC which controls the VMG.

For example, in the H.248.55 protocol, the resource strategy control comes in two modes: Context-created MG pull mode, and Context-less MG pull mode. In the Context-created MG pull mode, the VMG has created information about the context and the termination. If the event triggering message received by the physical MG includes specific destination information that matches a VMG, the physical MG may report the detected event according to the uniquely determined VMG. In the Context-less MG pull mode, the VMG has not created the relevant context and the termination information. If the event triggering message received by the physical MG carries a parameter (for example, authorization token) that includes VMG selection information, and the physical MG is capable of resolving such information, the physical MG may also select a proper VMG to report the detected event.

However, the information on which the solution depends may be unavailable. For example, in the Context-less MG pull mode, when the carrier event is detected by the physical MG, the VMG may have not created the relevant resource address identifier. The event triggering message received by the physical MG may include no parameter (for example, authorization token, which is an optional parameter in the message) from which VMG information can be resolved; or, even if the event triggering message received in the physical MG includes a parameter from which the VMG information can be resolved, the MG may also be unable to obtain the selection information of the VMG through decoding. Therefore, this solution is not universal, and especially not suitable for the Context-less MG pull mode in the VMG.

In the practical application, the following circumstances may occur:

1. The physical MG receives the indication information such as authorization token and is capable of resolving such information, but such information is incapable of reflecting the selection information (address or identifier) of the VMG and/or MGC.

2. The physical MG receives the indication information such as authorization token, but is incapable of resolving the information, for example, the physical MG does not perceive the authorization token.

3. The physical MG receives no indication information such as authorization token. For example, the bearer event triggering message carries no indication information such as authorization token.

Another solution provided in the prior art is a mode similar to broadcast. That is, when the physical MG receives an event triggering message (for example, resource request message of the bearer layer), all the VMGs on which this event is currently set report the detected event to the MGC that controls the VMG, and then each MGC judges whether it is necessary to apply the corresponding processing measures.

In this solution, the physical MG does not select the specific VMG. Moreover, the quasi-broadcast mode generates plenty of information, increases unnecessary load between the physical MG and the MGC, and affects the working efficiency and performance of the MG and MGC.

Therefore, in the prior art, the physical MG has no proper mechanism for selecting the VMG after receiving the event triggering message.

SUMMARY

A method, apparatus and system for selecting a VMG are provided in the following embodiments.

A method for selecting a VMG, including:

receiving an event triggering message on the bearer layer, and resolving the source identifier information of the event triggering message;

matching the source identifier information of the event triggering message with the service domain information on a VMG; and judging whether the source identifier information of the event triggering message is included in the service domain according to the matching result; if the source identifier information of the event triggering message is included in the service domain according to the matching result, selecting the VMG corresponding to the service domain information.

An MGC includes a setting unit and an interacting unit, wherein:

the setting unit is adapted to set the service domain information on a VMG controlled by the MGC, and send the setting result to the interacting unit; and the interacting unit is adapted to receive the setting result from the setting unit, send the setting result to the corresponding VMG, and receive the response message returned by the VMG.

An MG includes at least one VMG, a storing unit, and a matching unit, wherein:

the storing unit is adapted to store the service domain information on the VMG; and the matching unit is adapted to resolve the source identifier information carried in an event triggering message, match the source identifier information with the service domain information on the VMG, and determine the corresponding VMG.

A VMG selecting system includes an MGC and an MG, wherein:

the MGC is adapted to set the corresponding service domain information for the controlled VMG, send the information to the corresponding VMG, and receive the response message returned by the VMG; and the MG is adapted to store the service domain information corresponding to the VMG, resolve the source identifier information carried in the event triggering message, match the source identifier information with the service domain information on the VMG, and determine the corresponding VMG.

By extending a property parameter, the disclosed embodiments set the service domain information on a VMG. After receiving the event triggering message on the bearer layer, the physical MG matches the source identifier information carried in the event triggering message with the service domain information on each VMG. If it is determined that the source identifier information is included in the service domain on a VMG, the physical MG may select the corresponding VMG accordingly. If the corresponding report event is set on the selected VMG, the selected VMG may report the detected event to the MGC. The method disclosed in the embodiments provide a comprehensive and efficient solution for a physical MG to select a specific VMG and report the detected event.

DETAILED DESCRIPTION

Figure 1:
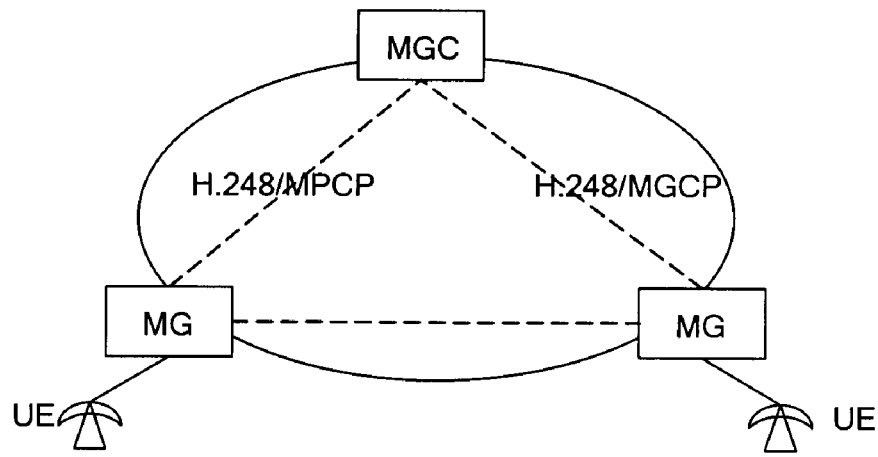
FIG. 1 is a networking diagram of the MG and the MGC in the prior art.
Figure 2:
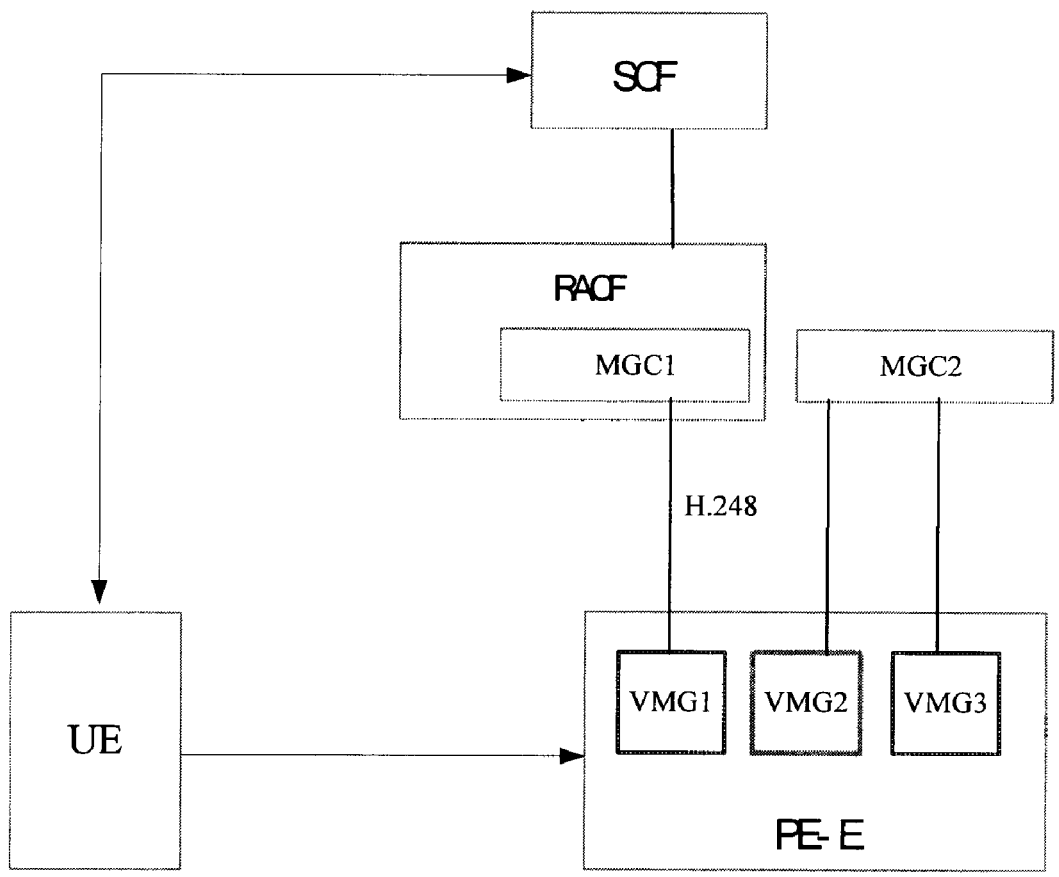
FIG. 2 shows a resource control structure in the VMG scenario in the prior art.

Generally, a control association consisting of an MGC and a VMG controlled by the MGC serves one or more specific domains or network device (UE, CPE or other network entities) groups. The required VMG may be selected correctly by checking the source identifier information (for example, domain, source address, port, and network device identifier) of the event triggering message. In order to make a correct selection, it is necessary to know the service domain information on each VMG. Therefore, by setting the corresponding service domain information for each VMG, the VMG can be selected correctly through comparison between the source identifier information of the event triggering message and the service domain information set on the VMG.

Particularly, the service domain information of the VMG according to the present invention is equivalent to the service domain information of the control association composed of the VMG and the MGC.

Particularly, the event triggering message according to the present invention may be a path coupled QoS signaling, for example, an RSVP Path message, or other resource request message on the bearer layer.

The embodiments of the present invention may indicate the service domain information of a VMG by extending a property parameter in the H.248 protocol, and the service domain information may be denoted in many ways, for example, a set of network domain identifier, network address, port, or network device identifier, etc. The extended property parameter herein is named "Request Domains under MGC Ownership (RDMO)".

Particularly, the RDMO property parameter may be defined in an existing package based on the H.248, for example, a Pull Mode Package (PLM) defined in the H.248.55, or a newly extended package.

The RDMO property parameter is set on the ROOT termination of the VMG as one of the properties of the MG.

Particularly, the type of the RDMO property parameter may be a string list. The value of each string instance or element in the list may be in diversified formats, for example, in the format of a domain name like "mynet.net", or in the format of a network address or other string formats.

Each string instance in the list is used to represent the service domain information.

Particularly, the RDMO property parameter may be sent by the MGC to the VMG, or preset on the VMG without being sent by the MGC. The MGC may also check the configuration information of the property parameter on each VMG by auditing the property parameter. The MGC may send the RDMO property parameter to the VMG through the local control descriptor information.

If an RDMO property parameter is set on the VMG when the VMG is selected, the physical MG and/or VMG matches the source identifier information of the event triggering message with the service domain information of the VMG indicated by the property parameter. If the source identifier information of the event triggering message is included in the domain information indicated by the RDMO property parameter of a VMG, this VMG is selected. Moreover, when the VMG has been set to detect the event corresponding to the event triggering message, the selected VMG sends a command (Notify) to report the detected event to the MGC that controls the VMG. If the source identifier information of the event triggering message is not included in the domain information indicated by the RDMO property parameter on a VMG, the corresponding VMG does not generate any event report.

In the H.248, in order to detect and report an event, the event needs to be set or sent beforehand. If no relevant detection event exists on the VMG, no message of reporting the event is generated even when the RDMO property parameter is set on the VMG and the source identifier information of the event triggering message is also included in the domain indicated by the RDMO property parameter on the VMG.

Accordingly, when a physical MG receives an event triggering message on the bearer layer, the relevant MGC identifier is resolved according to the current configuration information and/or the relevant information included in the received message. For example, the authorization token carried in the event triggering message, and then the specific VMG is determined according to the corresponding relation between the MGC and the VMG. The corresponding relation between the MGC and the VMG comes in the following two circumstances:

1. Each VMG is controlled by a different MGC, namely, not only the relation from the VMG to the MGC is a one-to-one relation, but also the relation from the MGC to the VMG is a one-to-one relation. After the identifier information of the MGC is obtained, the VMG information may be obtained according to the one-to-one relation between the MGC and the VMG, thus a uniquely VMG entity is determined to report the detected event.

2. Several VMGs are controlled by an MGC, namely, the relation from the VMG to the MGC is a one-to-one relation, but the relation from the MGC to the VMG may be a one-to-many relation. In this case, it is still impossible to determine the specific VMG according to the obtained MGC identifier information only. The VMG may be selected through the RDMO property parameter put forward herein. The setting of the specific RDMO property parameter is the same as described above.

In this case, it is not necessary to set RDMO property parameters on all VMGs. The service domain information of several VMGs controlled by the determined MGC, may however, be known. Accordingly, the source identifier information of the event triggering message may be matched with the service domain information indicated by the RDMO property parameter of the several VMGs, and the proper VMG is selected from the several VMGs. In this way, the specific VMG is selected quickly and efficiently by comparing the source identifier information of the event triggering message with the service domain information indicated by the RDMO property parameter of the VMG in light of the MGC identifier.

Particularly, when a physical MG receives an event triggering message on the bearer layer, if a specific set of VMGs may be resolved according to current configuration information and/or relevant information included in the received message, then a VMG may be selected from the specific set of VMGs based on the method for setting the RDMO property parameter provided by the disclosed embodiments.

From the perspective of the physical MG, the relation between the VMG and the MGC is a one-to-one relation, namely, a specific VMG may uniquely identify an MGC. Therefore, the corresponding MGC is uniquely determined after the VMG is selected according to the disclosed embodiments.

Figure 3:
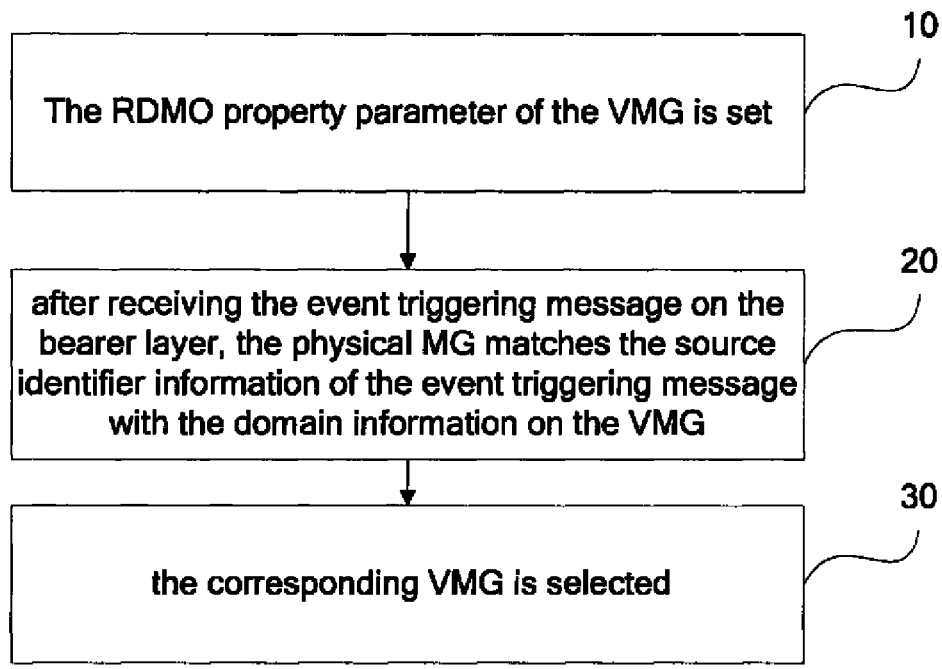
FIG. 3 is a flowchart of a method for selecting an MG according to disclosed embodiments.

As shown in FIG. 3, the method for selecting an MG based on the extended H.248 according to an embodiment of the present invention may include:

Step 10: The RDMO property parameter of the VMG is set.

The RDMO property parameter of the VMG may be sent by the MGC to the VMG through the local control descriptor information, or preset on the VMG without being sent by the MGC. The MGC may also check the configuration information of the property parameter by auditing the property parameter.

As described above, the type of the RDMO property parameter may be a string list. The value of each string instance or element in the list may be in the format of a domain name like "mynet.net", or in the format of a network address or other string formats.

The RDMO property parameter may be defined in an existing package based on the H.248, for example, a Pull Mode Package (PLM) defined in the H.248.55, or a newly extended package. The RDMO property parameter is set on the ROOT termination of the VMG as one of the properties of the MG.

Step 20: After receiving the event triggering message on the bearer layer, the physical MG resolves the source identifier information of the event triggering message. The physical MG matches the source identifier information with the domain information indicated by the RDMO property parameter of each VMG under the control of the physical MG, and determines whether the source identifier information is included in the service domain information indicated by the RDMO property parameter of each VMG. If the service domain information on a VMG includes the source identifier information, this VMG is selected. After the VMG is selected, a judgment is made about whether the event corresponding to the event triggering message is already set on the VMG. If the event is already set on the VMG, the process proceeds to step 30; otherwise, the process ends.

Particularly, after the physical MG receives an event triggering message on the bearer layer, the event triggering message is forwarded to each VMG. Each VMG resolves the source identifier information of the event triggering message, matches this source identifier information with the corresponding service domain information of the VMG, and judges whether the source identifier information is included in the service domain indicated by the RDMO property parameter set by the VMG. If the source identifier information is included in the service domain indicated by the RDMO property parameter set by the VMG, the VMG is determined as the selected VMG. A further judgment is made about whether the event corresponding to the event triggering message is already set on the VMG. If the event is already set on the VMG, the process proceeds to step 30; otherwise, the process ends.

The method for determining whether a source identifier information is included in the service domain information on a VMG comprises:

the physical MG compares the source identifier information with the service domain information on each VMG, and judges whether the source identifier information is included in the service domain information on one of the VMGs, or the physical MG determines the VMGs that share the network interface according to the network interface corresponding to the received event triggering message; and compares the source identifier information with the service domain information on determined VMGs, and judges whether the source identifier information is included in the service domain information on one of the VMGs; or the physical MG distributes the event triggering message to each VMG. Each VMG compares the source identifier information of the event triggering message with the corresponding service domain information of the VMG, and judges whether the source identifier information is included in the corresponding service domain information of the VMG; or the physical MG determines the VMGs that share the network interface according to the network interface corresponding to the received event triggering message; and distributes the event triggering message to the determined VMGs. Each determined VMG compares the source identifier information of the event triggering message with the corresponding service domain information of the VMG, and judges whether the source identifier information is included in the corresponding service domain information of the VMG.

Step 30: The corresponding VMG is selected according to the matching result, and the selected VMG reports the event detection message to the MGC.

Figure 4:
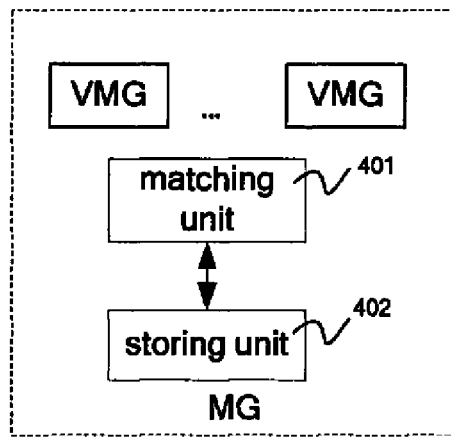
FIG. 4 shows a structure of an MG according to disclosed embodiments.

As shown in FIG. 4, an MG provided in an embodiment of the present invention includes at least one VMG, a matching unit 401, and a storing unit 402, wherein:

the matching unit 401 is adapted to resolve the source identifier information carried in the event triggering message, match the source identifier information with the service domain information on the VMG, and determine the corresponding VMG; particularly, the matching unit 401 may be set in each VMG to match the service domain information of the corresponding VMG with the source identifier information of the event triggering message; and the storing unit 402 is adapted to store the service domain information on the VMG; particularly, the storing unit 402 may be set in each VMG to store the service domain information on the corresponding VMG.

Figure 5:
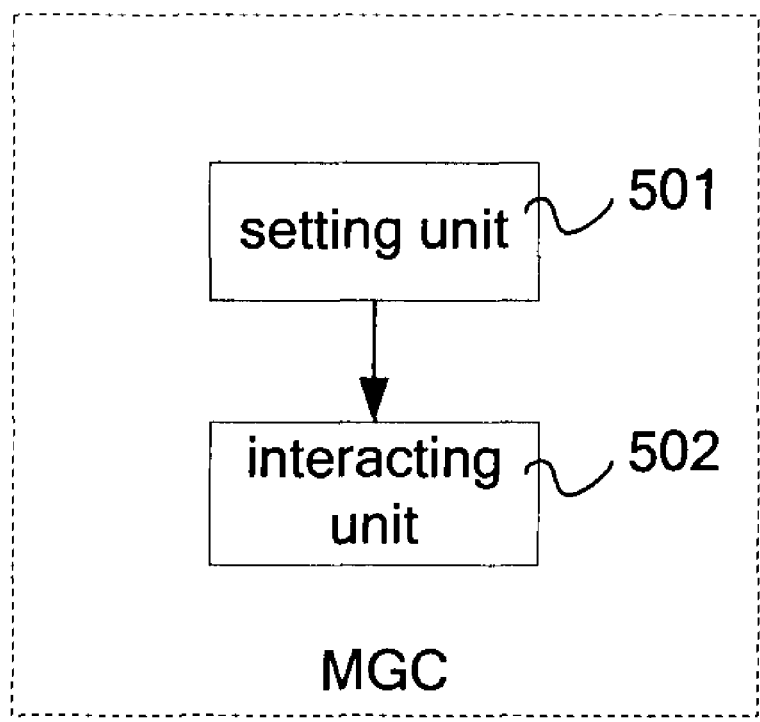
FIG. 5 shows a structure of an MGC according to disclosed embodiments.

As shown in FIG. 5, an MGC provided in an embodiment of the present invention includes a setting unit 501 and an interacting unit 502, wherein:

the setting unit 501 is adapted to set the corresponding service domain information for the VMG controlled by the MGC, and send the setting result to the interacting unit 502; and the interacting unit 502 is adapted to receive the allocation result sent by the setting unit 501, send the allocation result to the corresponding VMG, and receive the response message from the corresponding VMG.

Figure 6:
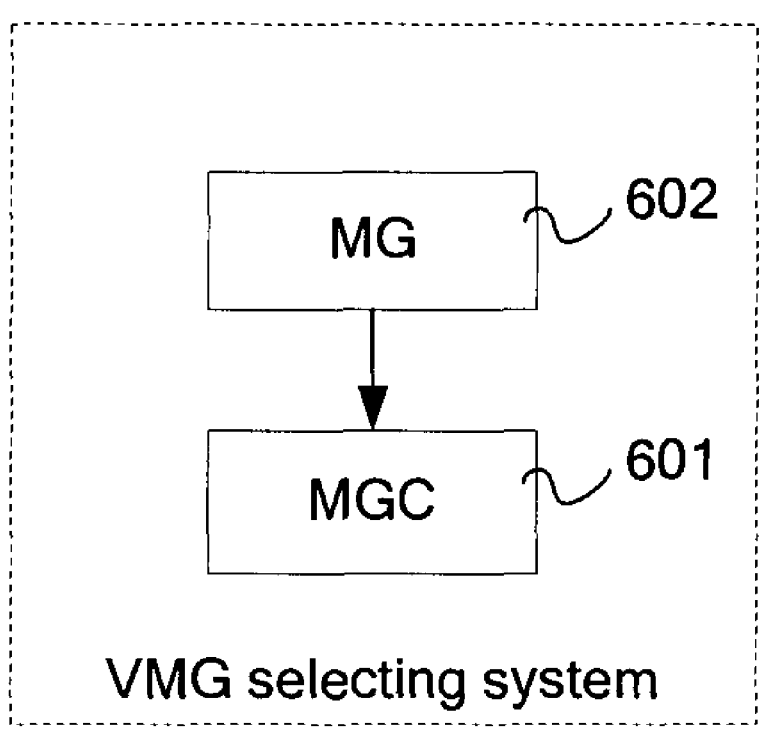
FIG. 6 shows a structure of a VMG selection system according to disclosed embodiments.

As shown in FIG. 6, a VMG selecting system provided in an embodiment of the present invention includes an MGC 601 and an MG 602, wherein:

the MGC 601 is adapted to set the corresponding service domain information for the VMG, send the information to the corresponding VMG, and receive the response message from the corresponding VMG; and the MG 602 is adapted to store the service domain information corresponding to the VMG, resolve the source identifier information carried in the event triggering message, match the source identifier information with the service domain information on the VMG, and determine the corresponding VMG.

Based on the foregoing method, apparatus and system, the following embodiments give details about the principles of the technical solution, detailed implementation modes and the benefits of the solution.

Figure 7:
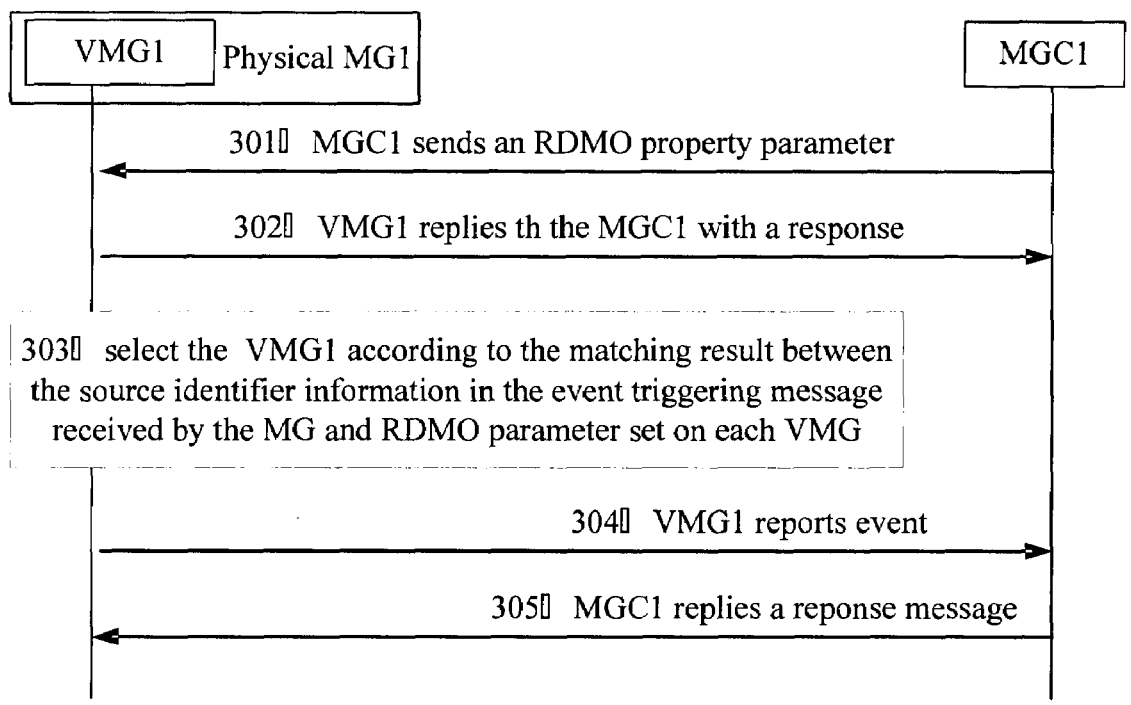
FIG. 7 shows a method for selecting an MG based on the extended H.248 according to disclosed embodiments.

FIG. 7 shows a method for selecting an MG based on the extended H.248 protocol according to an embodiment of the present invention. The method includes the following:

Step 301: After the VMG1 and the MGC1 creates a control association through a registration process, the MGC1 sends an RDMO property parameter and the detection event of resource reservation request (PLM/RDRR) in the H.248.55 to the VMG1 through a Modify message.

The RDMO property parameter is adapted to indicate the service domain information of the VMG1. The service domain information of the VMG1 may be a set of network domain identifier, network address, port, or network device identifier, etc.

For example, the specific message content may be:

```
MGC1 to MG1:
MEGACO/3 [123.123.123.4]:55555
Transaction = 9999 {
    Context = - {
        Modify = ROOT {
            Media { TerminationState {
                plm/rdmo="mynet.net",
```

```
        },
    }
    Events = 2222 {plm/rdrr}
            }
        }
    }
}
```

It is supposed that the IP address of the VMG1 is 124.124.124.222 in the message, the MGC1 address that controls the VMG1 is 123.123.123.4. Both VMG1 and MGC1 use 55555 as a Megaco port. It is supposed that the RDMO property parameter is included in the Pull Mode Package (PLM) defined in the H.248.55. The value of the RDMO property parameter is "mynet.net", which indicates the domain served by the VMG1, namely, the source address information of the event triggering message handled by the VMG1.

Step 302: The VMG1 replies to the MGC1 with a response. The details of the response are:

```
MG1 to MGC1:
MEGACO/3 [124.124.124.222]:55555
Reply = 9999 {
    Context = - {Modify = ROOT}
}
```

Step 303: The physical MG receives the event triggering message from the bearer layer on the network interface, and obtains the source identifier information (for example, source address) of the message, and then compares the source identifier information with the service domain information indicated by the set RDMO parameter. Suppose that the source address falls within the "mynet.net" domain, it is thus definite that the VMG1 should report the relevant RDRR events.

Particularly, if the event triggering message received by the physical MG includes an authorization token parameter, the physical MG resolves the identifier of the MGC from the parameter, and thus selects the VMG quickly according to the corresponding relation between the VMG and the MGC. For example, if the MGC entity is determined as MGC1 according to the authorization token, the proper VMG entity may be determined by comparing the source address of the event triggering message with the domain information indicated by the RDMO property on all the VMGs controlled by the MGC1.

Step 304: The selected VMG1 reports the message to MGC1 through a Notify command. The contents of the message are:

```
MG1 to MGC1:
MEGACO/3 [124.124.124.222]:55555
Transaction = 10000 {
    Context = - {
        Notify = ROOT {ObservedEvents =2222 {
            19990729T22000000:plm/rdrr{authtok="xxx"}}}
    }
}
```

Step 305: The MGC1 replies to the VMG1 with a Notify response. The contents of the response are:

```
MGC1 to MG1:
MEGACO/3 [123.123.123.4]:55555
Reply = 10000 {
    Context = - {Notify = ROOT}
}
```

The process, in which the MGC1 sets and sends the RDMO property parameter of the VMG1 and the VMG1 receives the event triggering message and reports it to the MGC1, is finished.

In the final analysis, by extending a property parameter, the embodiments of the present invention set the service domain information on a VMG. After receiving the event triggering message on the bearer layer, the physical MG matches the source identifier information carried in the event triggering message with the service domain information on each VMG. If determining that the source identifier information is included in the service domain on a VMG, the physical MG may select the corresponding VMG accordingly, and the selected VMG may report the detected event to the MGC. The method provided in the disclosed embodiments may provide a comprehensive and efficient solution for a physical MG to select a specific VMG and report the detected event.

Moreover, because the VMG corresponds to the MGC in a one-to-one relation, the corresponding MGC is selected only if the VMG is selected according to the method according to the present invention, thus accomplishing the objective of selecting the MGC.

In the final analysis, by extending the H.248 protocol, the disclosed embodiments implement the method of selecting an MG, and providing a comprehensive efficient solution for a physical MG to select the specific VMG and the corresponding MGC.

Although the invention has been described through some exemplary embodiments, the invention is not limited to such embodiments. It is apparent that those skilled in the art can make various modifications and variations to the present invention without departing from the spirit and scope of the present invention. The present invention is intended to cover these modifications and variations provided that they fall in the scope of protection defined by the claims or their equivalents.

What is claimed is:

1. A method for selecting a Virtual Media Gateway (VMG) comprising:
   receiving an event triggering message on a bearer layer;
   resolving source identifier information of the event triggering message;
   matching the source identifier information of the event triggering message with service domain information on a VMG; and
   selecting the VMG corresponding to the service domain information which comprises the source identifier information of the event triggering message according to a matching result;
   wherein the service domain information on the VMG is indicated by a property parameter named Request Domains under Media Gateway Controller (MGC) Ownership (RDMO) in H.248 protocol.

2. The method of claim 1, wherein the service domain information is sent by a Media Gateway Controller (MGC) to the VMG, or preset on the VMG.

3. The method of claim 2, wherein the service domain information comprises at least one of a network domain identifier, a network address, a port, or a network device identifier.

4. The method of claim 2, wherein the service domain information is sent by the MGC to a ROOT termination of the VMG, or preset on the ROOT termination of the VMG.

5. The method of claim 2, wherein the event triggering message carries relevant information of the MGC, and the method further comprises:
   resolving an address or an identifier of the MGC according to the relevant information;
   when the MGC controls more than one VMGs, determining whether the service domain information of the more than one VMGs controlled by the MGC comprises the source identifier information; and
   selecting the VMG with the service domain information comprising the source identifier information.

6. The method of claim 1, further comprising:
   sending, by the VMG, a detected event to the MGC which controls the VMG.

7. The method of claim 1, wherein the selecting of the VMG comprises:
   comparing the source identifier information with the service domain information on VMGs of a physical Media Gateway (MG); and
   judging whether the source identifier information is comprised in the service domain information on one of the VMGs.

8. The method of claim 1, further comprising:
   selecting a corresponding MGC according to information of the selected VMG.

9. The method of claim 1, wherein the event triggering message on the bearer layer is received by a physical Media Gateway (MG) or the VMG.

10. The method of claim 1, wherein the selecting of the VMG comprises:
    determining VMGs of a physical Media Gateway (MG) that share a network interface according to the network interface corresponding to the received event triggering message;
    comparing the source identifier information with the service domain information on the determined VMGs; and
    judging whether the source identifier information is comprised in service domain information on one of the determined VMGs.

11. The method of claim 1, wherein the selecting of the VMG comprises:
    distributing the event triggering message to VMGs of a physical Media Gateway (MG);
    comparing, by the VMGs, the source identifier information of the event triggering message with the service domain information of the VMGs; and
    judging whether the source identifier information is comprised in the service domain information of the VMGs.

12. The method of claim 1, wherein the selecting of the VMG comprises:
    determining VMGs of a physical Media Gateway (MG) that share a network interface according to the network interface corresponding to the received event triggering message;
    distributing the event triggering message to the determined VMGs;
    comparing, by the determined VMGs, the source identifier information of the event triggering message with the service domain information of the determined VMGs; and
    judging whether the source identifier information is comprised in the service domain information of the determined VMGs.

13. A Media Gateway (MG) comprising at least one Virtual Media Gateway (VMG), a storing unit, and a matching unit, wherein:
    the storing unit is adapted to store service domain information on a VMG; and
    the matching unit is adapted to resolve source identifier information carried in an event triggering message, match the source identifier information with the service domain information on the VMG, and determine the VMG corresponding to the source identifier information;
    wherein the service domain information on the VMG is indicated by a property parameter named Request Domains under Media Gateway Controller (MGC) Ownership (RDMO) in H.248 protocol.

14. The MG of claim 13, further comprising a plurality of storing units and a plurality of matching units on each of the at least one VMG.

15. A Virtual Media Gateway (VMG) selecting system, comprising:
    a Media Gateway Controller (MGC) and a Media Gateway (MG) which comprises at least one VMG, wherein:
    the MGC is adapted to control the VMG and to set service domain information for the VMG, send the information to the VMG, and receive a response message returned by the VMG; and
    the MG is adapted to store the service domain information corresponding to the VMG, resolve source identifier information carried in an event triggering message, match the source identifier information with the service domain information on the VMG, and determine the corresponding VMG;
    wherein the service domain information for the VMG is indicated by a property parameter named Request Domains under MGC Ownership (RDMO) in H.248 protocol.

* * * * *